United States Patent [19]

Tyson et al.

[11] Patent Number: 4,544,491

[45] Date of Patent: * Oct. 1, 1985

[54] RECOVERY OF HYDROCARBON OIL FROM FILTER CAKES

[75] Inventors: William H. Tyson, Moraga; Frank A. Stuart, San Rafael, both of Calif.

[73] Assignee: Claypro Associates, San Francisco, Calif.

[*] Notice: The portion of the term of this patent subsequent to Feb. 26, 2002 has been disclaimed.

[21] Appl. No.: 526,011

[22] Filed: Aug. 24, 1983

[51] Int. Cl.$^4$ .................. B01D 37/00; C02F 1/00
[52] U.S. Cl. .................... 210/772; 210/797; 210/804; 208/179; 208/11 LE; 208/183
[58] Field of Search .............. 208/179, 11 LE, 182, 208/183; 134/40, 25.1; 210/768, 769, 770, 772, 766, 797, 804

[56] References Cited

U.S. PATENT DOCUMENTS

| | | | |
|---|---|---|---|
| 2,387,488 | 10/1945 | Acken et al. | 210/768 |
| 2,579,946 | 12/1951 | McClain | 210/768 |
| 2,768,120 | 10/1956 | Rietema | 210/768 |
| 2,902,439 | 9/1959 | Milz et al. | 208/183 |
| 3,433,816 | 3/1969 | Muller | 210/772 |
| 3,707,464 | 12/1972 | Burns et al. | 210/705 |
| 3,725,467 | 4/1973 | Chorney | 260/504 A |
| 3,790,474 | 2/1974 | Moffitt | 208/179 |
| 4,014,709 | 3/1977 | Dykstra et al. | 210/147 |
| 4,158,638 | 6/1979 | Tsai | 208/11 LE |
| 4,247,389 | 1/1981 | Johnson et al. | 208/182 |
| 4,443,323 | 4/1984 | Horikoshi et al. | 208/11 LE |
| 4,501,670 | 2/1985 | Tyson et al. | 210/772 |

FOREIGN PATENT DOCUMENTS

| | | | |
|---|---|---|---|
| 242272 | 7/1926 | United Kingdom | 208/179 |
| 269148 | 2/1928 | United Kingdom | 208/179 |
| 327721 | 4/1930 | United Kingdom | 208/179 |

Primary Examiner—Barry S. Richman
Assistant Examiner—Titus B. Ledbetter, Jr.
Attorney, Agent, or Firm—Limbach, Limbach & Sutton

[57] ABSTRACT

A process for recovering hydrocarbon oils and hydrocarbon oils containing dissolved additives from filter cakes produced by filtering such oils using a siliceous filter aid.

A small amount of a release agent, up to 2 cc per gram of filter cake, is slowly added to the filter cake with agitation to prevent formation of a release agent phase and then a further quantity of release agent is added to the resultant mixture with gentle stirring and the final mixture is then held quiescent at elevated temperature until an oil phase separates. The oil phase is removed and the remainder of the mixture is filtered to separate a release agent filtrate and a filter cake consisting mainly of filter aid.

10 Claims, No Drawings

RECOVERY OF HYDROCARBON OIL FROM FILTER CAKES

TECHNICAL FIELD

This invention relates to a process for recovering hydrocarbon oils or hydrocarbon oils containing dissolved additives from filter cakes which are produced during filtration of these oils using a siliceous filter aid.

BACKGROUND ART

In the commercial production of lubricating oils, particularly hydrocarbon oils of lubricating viscosity, for example, viscosities in the range about 100 to 1,000 SUS at 100° F., such oils containing dissolved additives of various kinds and the additives themselves, a terminal step in the process of manufacture is frequently filtration and in the filtration a filter aid which is siliceous in character being a material such as diatomaceous earth, fuller's earth, etc. is employed. During the filtration filter cakes are produced which consist of a filter aid and a very appreciable amount of contained oil or additive solution in oil. Filter aids of this kind have high surface areas and adsorb organic compounds, usually in amounts about equal to their own weight. Disposal of such filter cakes as an industrial waste presents two problems. First, there is an appreciable loss of valuable product contained in the filter cakes and increasing environmental concerns have made it impossible to simply dump the filter cake and have required that it be treated in some manner to reduce the oil content before dumping or that it be disposed of at an approved waste disposal site.

Such filter cakes are frequently washed with an organic solvent to remove the heavier oils contained on the cake, but this results in the displacement of one organic material with another and is not a very satisfactory solution to the problem. The filter cakes also have been subjected to incineration during which the contained oil is burned and the residual clay is then disposed of. The products of combustion, however, require processing before they are released to the atmosphere and this increases cost of disposal and, of course, involves the loss of the valuable contained material.

Proposals have been made to treat such filter cakes to recover contained oil. Lorenz et al U.S. Pat. No. 3,835,021 describes filtration of refinery oil sludges, using diatomaceous earth as a filter aid to separate the oil from the sludge. The filter cake produced durin9 such filtration is then washed with water at 125° F. to 200° F. to remove a substantial part of the oil and the filter cake is then discarded.

Chorney U.S. Pat. No. 3,725,467 describes treatment of a filter cake produced by filtering an oil solution of a calcium mahogany sulfonate additive, using diatomaceous earth as a filter aid, with an aqueous solution of certain acids whose calcium salts are water soluble to recover a substantial part of the organic materials contained in the filter cake.

DISCLOSURE OF INVENTION

Pursuant to the invention, filter cakes of the type above described are contacted with an aqueous release agent, which may be either a water solution of an acid acting material or a water solution of a base acting material, at elevated temperature to remove contained oil or contained oil solution of additive so completely that the solid portion of the filter cake can be disposed of at any convenient dump site without special precautions and the oil contained in the filter cake is recovered and can be put to practical and economic use.

DETAILED DESCRIPTION OF THE INVENTION

The filter cakes which are treated pursuant to the process of the invention are filter cakes produced when hydrocarbon oils, hydrocarbon oils containing dissolved additive materials or the additive materials themselves are filtered using a siliceous filter aid.

The filter aids used in these filtrations are usually diatomaceous earth or diatomaceous earth which has been processed to some degree by commercial suppliers, and montmorillonite.

The oils contained in the filter cake are hydrocarbon oils ranging in molecular weight ordinarily from about 250 to 1,000 and such oils containing any of a number of additives dissolved in them. The additive materials are added to the oils to increase their life during use as engine lubricants. The most widely used additives are sulfonates, succinimides, viscosity index improvers, thiophosphates, and phenates.

The sulfonate additives are prepared by reacting a lubricating oil cut of crude petroleum or a synthetic dialkylbenzene having 12 to 15 carbon atoms in the alkyl chains or monoalkyl benzenes having longer alkyl side chains with concentrated sulfuric acid or sulfur trioxide and then neutralizing, commonly with an alkaline earth metal, most commonly calcium or magnesium. An excess of calcium oxide or calcium carbonate is commonly incorporated into the calcium sulfonate to provide what is referred to as an overbased sulfonate. The sulfonates act as detergents in the lubricating oil composition containing them and maintain impurities created during the course of use in suspension in the oil.

The succinimide additives are prepared by reacting maleic anhydride with a polybutene having an average molecular weight from about 700 to 1,000 to produce a polyisobutylene succinic anhydride which is then reacted with an ethylene polyamine, such as ethylene diamine, diethylene triamine, tetraethylene pentamine or mixtures of these amines. The succinimides act as detergent-dispersants when incorporated in the lubricating oil. Mannich bases are compounds similar to the succinimides prepared by alkylating benzene with polybutene of 700 to 1,000 molecular weight and then reacting the alkyl benzene product with formaldehyde and a polyamine. They serve the same purpose as the succinimides when incorporated in lubricating oil as an additive.

Copolymers of olefins and esters of acrylic or methacrylic acid are commonly added to lubricating oils for the purpose of improving viscosity index, i.e., to hold viscosity of the lubricating oil in a relatively narrow range during temperature changes.

Thiophosphates, most commonly zinc dithiophosphates are employed as lubricating oil additives to inhibit oxidation, control bearing corrosion and reduce wear. These compounds are prepared by reacting alcohols or alkylphenols with phosphorus pentasulfide to produce a dithiophosphoric acid which is then neutralized with zinc or occasionally with some other metals to form the finished additive.

Phenate additives are prepared by alkylating phenol with an olefin polymer usually propylene tetramer or pentamer. The resulting alkylphenols are crosslinked with sulfur or sulfur chloride and the crosslinked product is then neutralized with an alkaline earth metal, usually calcium or magnesium, to produce an additive commonly referred to as calcium or magnesium phenate. The phenate additives provide detergency and oxidation inhibition in lubricating oils.

The filter cakes obtained by filtering the hydrocarbon oils and additive containing hydrocarbon oils vary considerably in physical appearance, depending for the most part on whether the filter cake is washed with a light organic solvent before being discarded. The filter cakes which have not been washed with an organic solvent are generally gummy, pasty mixtures having the consistency of a medium weight putty. Those which have been washed with light solvents are usually fairly free flowing solid particles having lumpy agglomerations of the particles scattered through the mass.

In carrying out the process of the invention with a view to obtaining nearly complete removal of the contained oil from the solid materials constituting the filter cake, the following process variables have an important bearing on achieving an acceptable result.

First, it is necessary that the temperature at which the release agents and the filter cake are contacted and maintained in contact after initial mixing be an elevated temperature above at least 125° F. and preferably above 180° F. The upper limit of temperature unless recourse has led to the use of pressure vessels, will be the boiling point of the release agent. Temperatures generally are in the range about 180° F. to 220° F.

Second, the concentration of the release agent solution should be reasonably high. In general, the rapidity of oil separation increases with the strength of the release agent solution but there is a tradeoff between concentrations and economics and the concentrations employed as indicated in the working examples are representative of satisfactory concentrations.

Third, the ratio of release agent to filter cake employed in the process should be in the range 3 cc to 5 cc of release agent per gram of filter cake.

Fourth, the method of mixing and contacting the release agent with the filter cake is a controlling factor in determining whether the process results are acceptable or not. The quantity of release agent initially mixed with filter cake should be not less than 0.5 cc per gram of filter cake and should not exceed about 2 cc per gram of filter cake. A mixture of this ratio of release agent to filter cake is made and the resulting mixture is vigorously agitated usually for a period of 5 to 15 minutes at a temperature above about 180° and then allowed to stand for several minutes until an oil phase begins to appear at the top of the mixture. Then, an additional quantity of release agent sufficient to bring the total quantity of release agent to filter cake to a level in the range 3 cc to 5 cc of release agent per gram of filter cake is added to the previously made mixture with very gentle stirring while maintaining the temperature at the above indicated temperature. The final mixture is then held in quiescent condition at a temperature above 180° for a period usually several minutes to an hour during which an oil phase separates at the top of the mixture and this oil phase can be removed as a recovered and useful oil product. The lower phase which is a slurry of filter cake solids in release agent is then filtered and the filter cake which is essentially filter aid is dried and can be disposed of at will or can be frequently reused as filter aid in filtering further quantities of the oil material being subjected to the filtration step.

Fifth, many of the additives released are heavier than the releasing solution and very viscous. The addition of a small amount of a light solvent to the filter cake before treating with a releasing agent facilitates separation of such materials. In general the addition of 15–50 cc's of a suitable solvent, such as toluene, xylene or a petroleum thinner, to 100 grams of the used filter cake is adequate to achieve this effect. In certain cases the addition of an inert salt solution, such as concentrated sodium chloride solution, will also improve the separation by increasing the density of the releasing agent and assisting the released additive to float to the surface. Usually 10–30% of sodium chloride is adequate for this purpose.

While the above procedure provides a satisfactory separation of oil from filter cake solids, optimum separation is obtained if the initial 0.5 cc to 2 cc of release agent is added to the filter cake slowly and with continuous mixing the rate of addition and degree of mixing being carried on so that no appreciable aqueous phase appears above the filter cake solids.

An oil phase which separates at the end of the addition of the 0.5 to 2 cc quantity of release agent followed by settling can be decanted when it separates, if desired, or the entire mixture including the oil phase can be subjected to the addition of the further quantity of release agent and separated as above described.

If the entire quantity of release agent used in the process is added at once or in one step to the filter cake, the process does not operate satisfactorily. In some cases essentially no oil phase separates and in others there is a separation but it is attended by the production of an appreciable amount of emulsion underlaying any separated oil layer which gives rise to further problems of recovery of the oil itself as a product.

A somewhat generalized description of the process by which hydrocarbon oils and hydrocarbon oils containing each of several additive types are separated from filter cakes obtained during filtration of these materials using a siliceous filter aid follows.

HYDROCARBONS

Siliceous filter cakes obtained during filtration of hydrocarbon oils which may be petroleum fractions or dialkylbenzenes or polyalphaolefins all having molecular weights in the range about 250 to 1,000 using a siliceous filter aid can be treated to recover the oil as follows:

100 grams of filter cake heated to a temperature in the range about 100° to 220° F. are slowly mixed with about 70 to 150 cc of either acid or alkaline release agent with continuous mixing so that no separate aqueous phase is formed on the surface of the filter cake. During the mixing the temperature is brought to the level in the range 180° to 212° F. and as the mixing occurs, release of oil is evident and initially forms globules on the surface of the solid material. The globules coalesce and form an oil phase on the surface of the lower solids release agent layer. The mixture is then held at a temperature between 180° F. and 212° F. for 5 to 30 minutes at the end of which time further quantity of the release agent is added until the total volume of added release agent is in the range 300 to 600 cc. This further addition may be preceded by decanting the oil phase. The resultant mixture is held quiescent at 180° F. to 212° F. and three phases form, an upper hydrocarbon phase, a middle aqueous phase of release agent and a lower phase of filter aid-release agent slurry. The hydrocarbon phase is decanted and the two lower phases are separated to recover the filter cake solids as a final filter cake.

THIOPHOSPHATES 100 grams of a filter cake obtained by filtering zinc dithiophosphate using a siliceous filter aid is heated to a temperature about 100° F. to 200° F. and then 70 to 110 cc citric acid to which a small amount of sodium hydroxide sufficient to bring the pH to about 4.5 to 5 is added to the filter cake with constant stirring while holding the temperature of the mixture at about 180° F. The rate of addition of the release agent and the vigor of mixing are such that no separate aqueous phase is permitted to form during the mixing process. As the mixing proceeds, release of oil will be shown by the formation of glistening grayish oil phase on the surface of the solids in the cake. This mixture is then heated and held quiescent for 5 to 30 minutes at about 180° F. to 212° F. during which it separates into two phases. At the end of the settling period a further quantity of release agent is added to bring the total volume of release agent added to a level in the range 300 to 500 cc. The mixture is stirred very gently during the addition of the further quantity of release agent. The resultant mixture is then held at 180° F. to 210° F. for a time sufficient to cause the separation of oil and aqueous phases.

The density of the dialkyldithiophosphate is high and it tends to separate at the surface of the solid material but below the surface of the supernatant release agent. Recovery of the oil phase is facilitated by adding a concentrated solution of a soluble inorganic salt, such as sodium chloride to the mixture. After such addition, the oil phase rises to the top and becomes the upper phase of the settled mixture.

SUCCINIMIDES 100 grams of a filter cake obtained by filtering an oil solution of a succinimide additive using a siliceous filter aid is heated to about 100° F. to 200° F. 200 cc of hot 20% sodium carbonate are slowly added to the filter cake with continuous agitation during the addition. When the addition of the 200 cc of sodium carbonate, which required about 10 minutes time, is completed oil has begun to separate and rise to the surface of the mixture. The mixture is heated to boiling for a period of 10 to 30 minutes and is held there while slowly diluting it with an additional 200 cc of the sodium carbonate release agent with only gentle stirring during the addition. The resultant mixture is held at temperature and allowed to separate forming three phases, an upper layer of thick oil, a relatively clear sodium carbonate solution layer and a bright white clay layer below. The oil layer is then separated and the two lower layers are filtered and the filter cake is washed with water and then can be disposed of in any convenient manner. Filter cakes containing oil having Mannich base additive dissolved in it can be treated in similar manner.

In treating filter cakes containing succinimides or Mannich bases it is preferred to use an alkaline release agent since the use of an acidic release agent would result in the formation of amine salts.

VISCOSITY IMPROVERS

A filter cake obtained by filtering oil containing a viscosity improver which was the copolymer of an olefin and a maleate ester was treated. 150 cc of 20% sodium carbonate were slowly added to 100 grams of the filter cake. The filter cake was constantly agitated during the addition of the sodium carbonate solution to the degree that substantially no separate aqueous phase appeared as the mixing was done. The resultant mixture was heated to boiling temperature and held at near boiling temperature for 5 to 30 minutes, then 200 to 400 cubic centimeters of additional hot sodium carbonate solution was added. The mixture was only gently stirred during this addition. After the addition was complete, the resultant mixture was held at 180° F. for a time sufficient to permit separation of an upper oil phase. This phase is then decanted and the remainder of the mixture is filtered to separate a clean filter cake consisting of the filter aid component of the cake.

PHENATES 100 grams of a filter cake obtained by filtering an oil solution of calcium phenate additive using a siliceous filter aid was slowly mixed with 90 cc of 2N sulfuric acid. The mixture was held at 180° F. during its formation and was continuously stirred to avoid the formation of a separate aqueous phase. When the addition of this first increment of sulfuric acid was complete the mixture was brought to a temperature in the range 200° F. to 210° F. and held quiescent for 10 to 30 minutes, then an additional 200 cc of sulfuric acid was slowly added with gentle stirring while maintaining temperature at 180° F. The mixture was held quiescent at 180° F. for about 15 minutes until a clear layer of solution had formed between an upper oil phase and a lower solid phase. The oil was decanted and the lower phase was filtered and washed for disposal.

SULFONATES 100 cc of 2N sulfuric acid was added to 100 grams of filter cake obtained by filtering oil containing dissolved calcium sulfonate additive using a diatomaceous earth filter aid. The acid was added slowly with continuous agitation over a period of 5 to 20 minutes while holding temperature at 210° F. When commencement of oil separation was noted, stirring was discontinued and the mixture was held quiescent for about 10-30 minutes. An additional 200 to 300 cc of sulfuric acid solution was then added to the mixture with gentle agitation. The resultant mixture was held at 200° F. until an upper oil phase separated. The oil phase was decanted in the lower phase was then filtered and a dry filter aid cake recovered.

In all of the foregoing generalized procedures the initial quantity of release agent may be added entirely at one time and the resultant mixture is then stirred. When this procedure is followed instead of using a slow addition with constant agitation a reasonably adequate separation of the oil is obtained in all cases but this procedure is less efficient in most cases than the slow addition procedure described above.

If, in any of the above described procedures the entire total quantity of release agent used is added at one time and the resultant mixture then stirred, oil recovery ranges from poor to very, very poor and the filter cake solids are not suitable for disposal, except in hazardous waste disposal sites.

Separation of oils and additive-containing oils from siliceous filter cakes obtained by filtering them using siliceous filter aids are described in the following examples.

HYDROCARBON SEPARATIONS

A 5-gallon sample of filter cake which had been used to filter a hydrogenated polyalphaolefin was obtained from the manufacturer. On arrival the sample was examined and found to consist of a gray mixture of filter aid and oil (polyalphaolefin) above which floated some of the free polyalphaolefin. This was removed by decanting and the remaining waste filter cake was stirred to provide a uniform mixture.

EXAMPLE 1

100 grams of this filter cake were heated in an oven to 200° F. Simultaneously, an aqueous solution of 1% sulfuric acid was heated to the same temperature. The filter cake was removed from the oven and 100 cc of hot sulfuric acid was added in small increments over a period of 5-10 minutes. During and after addition, the mixture was stirred and mixed vigorously with a spatula. The acid solution was adsorbed into the clay and the rate of addition and mixing were controlled so that no free aqueous phase was allowed to form after agitation. During this process, oil could be seen separating from the clay. After 100 cc of solution has been added, a layer of oil had separated out and floated on top of the filter cake/water phase which was a smooth uniform paste.

This mixture was then slowly diluted with an additional 200 cc of hot 1% sulfuric acid and allowed to stand quiescent about 10 minutes. The mixture separated into three phases—a lower phase of clean, white clay; an intermediate phase of dilute sulfuric acid, and an upper phase of 60 cc of clear, pale yellow polyalphaolefin with a trace of cuff at the interface. The oil was withdrawn, dried with Dreirite (anhydrous calcium sulfate) and decanted.

EXAMPLE 2

The above experiment was duplicated exactly except that instead of the slow gradual addition of initial hot acid to the filter cake, the entire 100 cc was rapidly added and the mixture then vigorously agitated. After several minutes of agitation, the acid solution began adsorbing into the clay and oil separation commenced. After about 10 minutes at 200° F., the mixture looked very similar to that obtained in Example 1.

An additional 200 cc of hot acid were added to this mixture in the same way as in Example 1 and after standing about 10 minutes separation occurred, yielding a lower phase of clean white filter aid, an intermediate layer of acid solution and an upper phase of about 60 cc of pale yellow polyalphaolefin. This run was inferior to Example 1 in that the cuff was larger and some emulsion existed below it. However, an adequate separation was obtained.

A 5-gallon sample of filter cake from another manufacturer was obtained. Leading to the production of this filter cake benzene had been alkalated with an olefin having a molecular weight of about 200. During this reaction, both mono- and di-alkyl benzenes were obtained. The mono-substituted benzene was distilled, leaving a brown colored dialkyl benzene bottoms fraction which was treated with carbon black and filtered using a diatomaceous earth filter aid. The resultant filter cake was saturated with dialkyl benzenes, contained carbon black and probably other impurities from the reaction and distillation.

EXAMPLE 3

A sample of 100 grams of this filter cake was slowly mixed with 0.5% sulfuric acid under the conditions described in Example 1 until 80 cc of the solution had been added. At this point 65 cc of dark oil had separated from the filter cake/water phase, which was a homogeneous, brownish paste. This oil was decanted from the paste. The lower phase was then diluted with 300 cc of hot 0.5% sulfuric acid and allowed to stand for half an hour at 200° F. Three phases were obtained—a lower phase of brown filter aid, an intermediate phase of 250 cc of dilute sulfuric acid and a small upper phase of approximately 3 cc of oil plus emulsion. This upper phase was removed and added to the decanted oil.

EXAMPLE 4

Example 3 was repeated but the 80 cc of hot sulfuric acid was added all at once to the 100 grams of filter cake as described in Example 2. Maceration and agitation of this mixture produced a separation in a few minutes.

63 cc of dark oil were decanted and the remaining paste was diluted with 320 cc of hot 0.5% acid. After standing for half an hour, a separation similar to that obtained in Example 3 but with slightly more emulsion.

A sample of filter aid was obtained from a crude oil producer operating a secondary recovery process. In this process, steam is injected into the well to promote recovery of crude oil. On return to the surface, water is separated from the crude oil. Before returning it to the boiler for recycling through the process, it is filtered using a siliceous filter aid to remove traces of oil and dirt and clay to avoid fouling of the boiler. The filter cake is a pasty mixture of the filter aid, dirt and clay and 10-20% of crude oil.

EXAMPLE 5

A sample of 50 grams of this filter cake was treated with 50 cc of 10% sulfuric acid using the addition technique described in Examples 1 and 3 of slow addition with continued mixing—all at 200° F. During this process a trace of oil broke free. On dilution with an additional 200 cc of 10% sulfuric acid, only a small amount of oil floated to the surface.

EXAMPLE 6

To 50 cc of this same filter cake, 30 cc of kerosene were added and mixed thoroughly at 180°-200° F. This mixture was then treated with 10% sulfuric acid in the same procedure described in Example 5 above.

In this case a good separation was obtained, yielding a lower phase of dark brown solid, a slightly cloudy layer of 10% sulfuric acid and approximately 37 cc of a dark brown kerosene solution of crude oil. The kerosene addition reduced the filter cake viscosity and facilitated contact between the cake and the acid.

EXAMPLE 7

Example 6 was repeated, the procedure differing only in that instead of the slow addition of 20% acid to the kerosene dispersion of filter cake, the entire 50 cc was added rapidly. This mixture was stirred and held at 200° F. for 15 minutes and then diluted with hot 10% acid, giving results almost equivalent to those obtained in Example 6.

DITHIOPHOSPHATE SEPARATIONS

A sample of filter cake was obtained which had been produced in the commercial filtration of a zinc dialkyl dithiophosphate. In this sample, the alkyl groups were $C_8$ chains and the material was filtered to remove excess reactants used in the process, such as the zinc oxide, traces of $P_2S_5$, etc. The filter cake was a dense, sticky gray mass.

This material was treated with a number of acid and alkaline solutions and the following general observations were made.

With acids, such as hydrochloric or oxalic, evolution of $H_2S$ occurred and the material released was pale green in color, indicating that the acids had attacked the thiophosphates to produce some degradation. With strongly basic materials, such as sodium hydroxide, sodium silicate, or sodium carbonate, no separation occurred—the mixture turning into a creamy mayonnaise-like emulsion. It is believed that under these conditions the strong bases attack the zinc thiophosphate and form the sodium thiophosphates. With bases of lower pH (below approximately 10), this reaction is avoided and the zinc thiophosphate is released. In all of these separations, however, the released zinc dioctyl dithiophosphate is heavier than the releasing solution and remains floating in globules below the releasing solution on top of the contained solids which makes separation rather difficult.

All of these problems can be avoided by using an acid or an acid salt with a pH of 3-5 in a 20% sodium chloride solution. Examples are acetic acid, succinic acid, or citric acid which has been titrated with sodium hydroxide until the mixture reaches the pH of 4-5.

EXAMPLE 8

3% citric acid dissolved in 20% sodium chloride solution was titrated with a concentrated solution of NaOH until a pH of 4.5 was obtained. The mixture was then heated to 180° F. A 90-gram sample of filter cake obtained during filtration of zinc thiophosphate was preheated in an oven to 180° F. and the citrate solution was added to the filter cake in small increments with vigorous agitation so that no separate aqueous phase formed during the mixing. By the time 20-30 cc of citrate solution was added the mixture was still quite stiff (it would not flow) but oil could be seen breaking loose from the filter cake and coating the filter aid surface. Addition was continued until a total of 65 cc of citrate solution had been added and the mixture was held at 180° F. with gentle agitation for about 5 minutes. At this stage the mix consists of two phases, the lower phase is a thick gray paste of filter aid and water; the upper phase is a gray opaque oil. The upper phase was decanted giving a yield of 45 cc of oil. The lower phase was then diluted with an additional 235 cc of citrate solution and allowed to settle, giving a lower phase of grayish white filter aid, a clear citrate solution and a few cc's of oil and cuff. This oil and cuff can be removed and added to the product previously decanted or it can be added to the next batch of filter aid before treatment with citrate solution.

Analyses indicated that the dark gray color of this recovered oil was due to the presence of zinc oxide suspended in the zinc dioctyl dithiophosphate.

EXAMPLE 9

Example 8 above was repeated, changing only the method of addition of the citrate solution. 65 cc of sodium citrate/sodium chloride solution with a pH of 4.5 and at 180° F. was added directly to 90 grams of filter cake at the same temperature. Initially no wetting of the clay occurred but as the mixture was worked and stirred with a spatula, the clay began adsorbing the water and after a few minutes at 180° F., the mixture looked very similar to that obtained in Example 8. After holding the mixture for 10 minutes at 180° F. with gentle agitation, oil was decanted and the residual waste solid was diluted as in Example 8 with essentially the same results.

EXAMPLE 10

90 grams of the filter cake used in Examples 8 and 9 were heated to 180° F. and to it was added rapidly 300 cc of 3% sodium citrate in 20% sodium chloride (pH 4.5—the same releasing solution used in Examples 8 and 9) at the same temperature. The mixture was immediately stirred and macerated but the cake did not adsorb any solution and no separation of oil was apparent. The mixture was held at 180°-200° F. for an hour with periodic agitation but the mixture remained unchanged. It had the appearance of sand dispersed in water and no separation of oil resulted.

A sample of waste cake from filtration of zinc dioctyl dithiophosphate was obtained from another manufacturer. This material was a gray colored, free flowing solid material and differed from the cake used in Examples 8, 9 and 10 in that it had apparently been washed with a solvent to remove some of the thiophosphate originally entrained in the filter aid.

EXAMPLE 11

A 90 grams sample of the above product was preheated in an oven to 180° F. and treated with 300 cc of the same citrate releasing solution used in Examples 8, 9 and 10 in the manner described in Example 10. The releasing solution was adsorbed by the waste cake and a separation of thiophosphate resulted. It was, however, a poor separation, yielding about 20 cc of this phosphate which contained appreciable quantities of filter aid. Part of the released thiophosphate contained so much filter aid that it sank down into globules on top of the main body of filter aid.

EXAMPLE 12

90 grams of filter cake of Example 11 was preheated to 180° F. and slow additon of the same releasing solution employed in Example 11, at 180° F. was initiated in the same mixing procedure described in Example 8. The filter cake adsorbed the releasing solution readily and oil could be seen separating after 30-40 cc of solution had been added. The mixture continued to adsorb water without forming a free water phase until a total of 110 cc of solution had been added. At this point, the mix was held at 180°-190° F. for 10 minutes with gentle agitation and 35 cc of a cloudy, pale yellow oil was decanted. After standing for several hours at 180° F., a small amount of a dark gray to black solid settled out, leaving the pale yellow zinc dioctyl dithiophosphate above it.

A sample of filter cake produced in commercial filtration of a zinc dialkyl dithiophosphate was obtained. This sample had not been washed and was a dense heavy gray colored paste. The alkyl side chains of this dithiophosphate were shorter than $C_8$ and appeared to be a mixture of $C_4$, $C_5$ and $C_6$ side chains.

EXAMPLE 13

A 90 grams sample of this filter cake was treated by the same procedure used in Example 8 above. After 65 cc of hot citrate releasing solution had been added, the mixture was held at 180° F. and a layer of gray oil separated above the filter aid-water phase. When this mixture was diluted with an additional 200 cc of the citrate releasing solution, the released oil sank in the aqueous phase and floated as a globule on top of the filter aid-water phase. 25 cc of hexane was added to the mixture which was gently agitated so that the dithiophosphate was diluted with the hexane and as mixing occurred, a hexane solution of the released thiophosphate floated to the surface where it was readily separated from the water phase.

SUCCINIMIDE SEPARATIONS

A sample of filter cake formed during filtration of a polybutenyl succinimide using a siliceous filter aid was obtained from an additive manufacturer. This material was a free flowing, light brown mass, mainly a powder with small oil-saturated chunks distributed through it.

EXAMPLE 14

100-gram sample of the above filter cake was heated to 200° F. and 105 cc of 20% sodium carbonate solution at the same temperature was added in small increments with thorough maceration and agitation between each addition. During the addition and particularly in its latter stages, light colored filter aid could be seen separating from the mixture and a thick, dark brown oil was released. After the 105 cc had been added, the mixture was held at 200° F. for 10 minutes with gentle agitation and then slowly diluted with an additional 195 cc of the same hot 20% sodium carbonate solution. The mixture was allowed to stand for half an hour in an oven at 200° F. and separated into three phases—the lower phase consisted of about 160 cc of a light tan colored suspension of filter aid in the carbonate solution; the upper phase consisted of about 60 cc of a slightly turbid hydrocarbon solution of the succinimide in diluent oil (the alkenyl succinimide is diluted with a light mineral oil before filtration). The remainder of the mixture formed an intermediate phase of dark brown but relatively clear aqueous solution.

EXAMPLE 15

Example 14 was repeated but instead of using the slow addition and mixing technique, 105 cc of 20% sodium carbonate was added immediately to the 100 grams of cake at 200° F. in a single addition. The mixture was held at 200° F. and macerated and stirred until a uniform blend occurred and separation of oil and filter aid resulted. On dilution with an additional 195 cc of carbonate solution and treatment of this mixture as in Example 14, separation with almost identical results occurred.

EXAMPLE 16

The oily products obtained in both Examples 14 and 15 were extremely viscous and separation can be facilitated in both cases by reducing the viscosity of the product with an inert hydrocarbon thinner, or light solvent such as toluene. This can be done after the separation has occurred by adding thinner to the oil phase until the desired viscosity is achieved (0.25–1 volume of thinner per volume of oil). Preferably, however, the original sample waste filter aid is dispersed in 0.25–1 cc volume with a thinner per gram of filter cake and then the separation conducted as above. The results are identical except that the apparent yield is increased by the volume of thinner added and the separation occurs more readily. Not only does the thinner reduce viscosity, but it also reduces the density and improves the separation at temperatures up to 200°–215° F. appreciably.

V.I. IMPROVER SEPARATIONS

A sample of filter cake was obtained from the manufacturer of a V.I. Improver synthesized by copolymerizing maleic anhydride with an olefin, followed by esterification of the maleic anhydride. This derivative diluted in a light mineral oil had been filtered, using a filter aid. The sample was a sticky mass, dark brown to almost black in color.

EXAMPLE 17

50 grams of the sample above was heated to 200° F. and treated with an aqueous solution of 10% commercial sodium carbonate also at 200° F. The carbonate solution was added in small increments with vigorous agitation following each addition so that no free aqueous phase was allowed to form before the next addition was made. Over about 10 minutes, 45 cc of solution was added and a good separation occurred with dark heavy oil floating over a lighter colored gray paste. The mixture was then slowly diluted with carbonate until a total of 150 cc had been added. At this point the mixture was allowed to stand and separated into three phases—35 cc of a dark oil above a light brown aqueous phase with a light tan solid at the bottom of the mixing vessel.

EXAMPLE 18

Example 17 was repeated with everything held constant except that 45 cc of hot sodium carbonate solution was added in a single addition, followed by immediate maceration and agitation. After about 5 minutes at 200° F., the releasing solution was adsorbed into the cake and a separation occurred which was almost identical to that obtained in Example 17. On dilution to 150 cc, a comparable separation was achieved.

EXAMPLE 19

Example 18 was repeated with everything held constant except that 150 cc of hot carbonate solution was added in a single addition to the 50 grams of filter cake. The mixture was held at 200° F. with agitation for 15–20 minutes and some separation resulted—but a separation that was inferior to either of the two preceding Examples. The oil had more filter aid and emulsion entrained in it and was obviously more contaminated than the two preceding Examples.

EXAMPLE 20

A run comparable to Example 17 was made on the same filter cake using a releasing solution of 20% sodium carbonate. To 50 grams of filter cake at 200° F., 35 cc of 20% sodium carbonate was added in small increments with vigorous agitation and maceration. Addition was discontinued at this point and the mixture was held just below the boiling point for 10 minutes. The oil was then decanted from the solid/water mass. Another 10 cc of hot sodium carbonate was then added to the pasty mixture of filter aid and releasing solution and more oil broke out, which was also decanted. An additional 10 cc was added in the same way and a trace more oil broke out and 1-2 cc more was decanted, giving a final yield of 35-36 cc of a dark clear oil. This oil was quite clear with very little clay or releasing solution entrained in it. The clay left at this point was then diluted with a total of 150 cc of hot 20% sodium carbonate, giving a very clean looking clay (lighter in color than the preceding runs) and on separation, a trace of oil on the top of the mixture.

It is apparent that by using a more concentrated solution of releasing agent and a lower volume, superior results are obtained.

EXAMPLE 21

As in the case of the succinimide separations described above, the oil released in Examples 17 through 20 is extremely viscous, even at the boiling point of the releasing solutions employed. Separation can be facilitated by dispersing the filter cake in ¼ to 1 volume of toluene or inert thinner as described for the succinimides and for the same reasons.

SEPARATION OF PHENATES

Three samples of filter cakes obtained during filtration of calcium alkyl phenate lubricating oil additives were obtained. The first sample was from filtration of highly overbased phenate, i.e., phenate which contains dispersed in the micelles free lime or calcium carbonate. This cake was a sticky yellow-gray mass. The second sample was from the same producer but was less overbased material and similar in appearance. The third sample was also from a highly overbased product produced by another manufacturer but apparently the filter cake had been solvent washed to remove some of the additive and the resultant cake was a dark brown, free flowing solid with more oily chunks of material dispersed throughout.

EXAMPLE 22

100 grams of the second sample described above was heated to 210° F. in an oven. Boiling 10% sulfuric acid was slowly added to the filter cake in small increments with thorough maceration and agitation between additions. In 10 minutes, 100 cc of acid had been added and the pH of the material was tested with Hydrion paper and showed that the product was still on the basic side (pH approximately 10-12). A further 10 cc of acid turned the mixture acidic but on continued agitation and heating, the pH returned to the basic side. White clay filter aid and/or calcium sulfate were seen forming in the mixture and a dark heavy oil broke free and floated to the surface. A further 20 cc of 10% hot acid was added, bringing the pH down to 8-9 and the mixture was stirred and percolated on the hot plate for five minutes and then allowed to stand in the oven for 5 minutes. 45 cc of dark oil separated and was decanted from the white solid material.

EXAMPLE 23

250 grams of the first phenate filter cake described above was heated to 210° F. and boiling 20% sulfuric acid was added using the slow addition technique described in Example 22. Over 10 minutes, 100 cc of acid was added, bringing the pH down to 8-9. Flecks of white filter aid and/or calcium sulfate were observed forming in the mixture which at this point was quite thick. Over the next 10 minutes another 100 cc of acid was added, the pH staying between 8-9 and oil could be observed glistening on the gray mass which, at this point was fairly readily stirrable. In the next 5 minutes another 50 cc of acid was added and the mixture was still on the basic side but the temperature had dropped to 130° F., so the mixture was put on the hot plate and reheated. Foaming commenced and dark oil broke out of the gray solids in sizable quantity. Over the next 10 minutes, the total volume of acid was brought to 300 cc with slow addition and continued stirring at around 200°-215° F. The mixture was allowed to percolate for 5 minutes and 110 cc of dark oil separated and was decanted.

EXAMPLE 24

100 grams of the third phenate filter cake described above was heated to 210° F. and boiling 2% sulfuric acid was added slowly in small increments with constant maceration and mixing between additions. By the time 50-60 cc of acid had been added, separation of the oil from the mix was apparent and the pH of the filter aid was strongly basic—pH between 10-12 measured on Hydrion paper. The mixture was still thick but by the time 90 cc had been added, the mixture had thinned out and had become easily stirrable and a good yield of brown oil had developed. The pH was still above 10.

In the next 10 minutes, 10 more cc's was added slowly, maintaining the temperature at approximately 200° F. and checking the pH constantly. The mixture was allowed to stand in the oven for 5 minutes at this point and 33 cc of dark oil was decanted.

There was more oil in the solid material but it could not be easily decanted; therefore, 20 cc of kerosene was added and the mixture stirred and allowed to stand and 25 cc of kerosene solution of the phenate oil was decanted. This amounted to an additional 5 cc yield, bringing the total yield at this point to 38 cc.

By this time the temperature of the mix had dropped to 140° F. so it was reheated back up to 200° F. and over the next 15 minutes, another 10 cc of acid was added and an additional 3 cc of oil decanted. An additional 20 cc of acid was added, bringing the pH down to about 8, at which point the mixture was diluted with 100 cc of hot water and put in the oven. After an hour, the mix had separated into three phases—about 5 cc of oil on the surface, 250 cc of clear acid and 150 cc of tan solids.

The foregoing indicates that by cautiously neutralizing the filter cake, the free lime and calcium carbonate or calcium hydroxide can be neutralized without attacking the calcium phenate. This results in liberation of high yields of calcium alkyl phenate dissolved in the hydrocarbon diluent oil in which it is manufactured. During this process, it is desirable to maintain the pH as high as possible to avoid any decomposition of the calcium phenate. It is also desirable to add the acid in small increments to avoid creating an isolated area where the pH becomes acidic and neutralization of the calcium phenate could occur.

Dilution of the original filter cake with toluene or a similar cheap inert thinner facilitates the reaction and minimizes neutralization of the calcium phenate.

A different approach to releasing valuable oil from the phenate filter cakes is to treat the filter cake with acid to bring the pH down to the region of 1-3 at which point the phenol will be released.

EXAMPLE 25

250 grams of filter cake (the third phenate filter cake described above) was dispersed in 250 cc of toluene at 140° F. 5% sulfuric acid at the same temperature was added with vigorous agitation. By the time 200–300 cc of acid had been added, white filter aid and/or calcium sulfate was seen precipitating and by the time 500 cc had been added, considerable solvent/oil solution was separating out. After the addition of 1500 cc of acid, the pH was down to 2 and further separation occurred, yielding a clean white filter aid/calcium sulfate and about 400 cc of slightly turbid oil floated above the intermediate acid layer. This organic layer was removed, dried with Dreirite and distilled. The product obtained was free phenol.

SEPARATION OF SULFONATES

Samples of filter cakes produced by filtering a variety of commercial calcium and magnesium sulfonates using siliceous filter aids were obtained. Products so filtered range from almost neutral sulfonates (i.e., little or no free base in the system) to moderately overbased sulfonates (total base numbers ranging from 25–50) and highly overbased products (TBN ranging from 200 to over 400). Some of these samples were prepared from "natural sulfonates"—i.e., products derived from a sulfuric acid treatment of crude lubricating oil cuts; others from synthetic sulfonates produced by sulfonation of synthetic alkyl or dialkyl benzenes; and others from mixtures of both types of sulfonates. These products were generally light brown, free flowing, granular solids, although occasional sticky products were seen.

EXAMPLE 26

500 grams of filter cake produced by filtering a neutral, natural calcium sulfonate using a siliceous filter aid was diluted with 350 cc of toluene and agitated at 140° F. until a uniform mix resulted. One liter of 2.5% sulfuric acid at 140° F. was added slowly while the mixture was agitated with a stirring rod. As addition proceeded a mixture of white filter aid and calcium sulfate was formed and dropped to the bottom and a toluene solution of the calcium sulfonate was released and rose to the top. The mixture was allowed to settle at 140° F. for about 10 minutes and about 650 cc of organic material was decanted off the top. It was dried over Dreirite and lime and distilled to yield 200 grams of product.

EXAMPLE 27

350 grams of filter cake from filtration of a highly overbased synthetic sulfonate was dispersed in 350 cc of toluene at 140° F. 1250 cc of 2N sulfuric acid at 140° F. was added slowly with moderate agitation in a slow continuous stream over a period of about 10 minutes. Separation occurred almost immediately. White filter aid/calcium sulfate dropped out of solution and toluene solution of released oil rose to the surface. This product was removed, dried over Dreirite and lime and distilled, giving a yield of about 140 grams. white precipitate formed, which, by the end of the run appeared to be relatively free of trapped oil. The mixture contained no free aqueous phase and after standing for 5 minutes at 180 to 200° F., an oil phase separated and was decanted from a pasty mixture of calcium sulfate and water. The volume of the separated oil was 65 ccs. The slurry underlying the separated oil phase was diluted with 200 ccs of hot water and then separated into three phases, a white calcium sulfate phase at the bottom, an intermediate phase of clear aqueous acid and about 5 cubic centimeters of oil overlying the aqueous phase.

EXAMPLE 30

A solids containing centrifuge stream obtained by centrifuging an overbased magnesium sulfonate additive in oil was treated with sulfuric acid. The centrifuge stream had a solids content of about 25% and the solids consisted of magnesium oxide, magnesium carbonate and magnesium hydroxide. 100 grams of the centrifuge stream were heated to 200° F. and 25 grams of fresh diatomaceous earth were added together with 40 grams of toluene. Eight normal sulfuric acid was added to the resulting mixture and by the time that 85 ccs. had been added oil began to separate out. Acid addition was continued until 100 cubic centimeters had been added. The pH after this addition was 7.8 and about 66 grams of oil separated from the centrifuge product and was decanted. 31 cubic centimeters of 8 normal sulfuric acid were then added bringing the pH to 7.3 and a few additional cubic centimeters of oil separated and were decanted. 22 cubic centimeters of 10 normal sulfuric acid were then added, bringing the pH to 2.6 but only a trace of additional oil separated. Oil separation in this example, in which fresh filter aid and toluene were added, were superior to results earlier obtained

EXAMPLE 28

100 grams of filter cake from filtration of a moderately overbased calcium sulfonate (total base number = 30) was dispersed in 50 cc of toluene at 180° F. This was treated with 3.8% sulfuric acid at the same temperature employing the technique of slow addition with vigorous agitation between increments. By the time 110 cc of acid had been added, a separation had occurred and the pH of the mixture by Hydrion paper was in the order of 8–9. 75 cc of a cloudy brown oil floated to the top and was decanted and set in the oven at 200° F. Over the next hour this oil separated into a clear brown oil (about 50 cc) and 20 cc of gray filter aid below it.

Several manufacturers of lubricating oil additives employ centrifugation rather than filtration to remove contained solids from the oil additive solution. Either basket or continuous type centrifuges may be employed and the solids contained stream coming from the centrifuge ordinarily has a solids content in the range of about 20 to 40 weight percent, being higher when basket centrifuges are employed. The solids containing centrifuge effluent is an opaque liquid with a viscosity comparable to that of kerosene and the solids are ordinarily suspended hydroxide and carbonate particles. The release agents employed are the same as those employed in treating the filter cake as heretofore described.

EXAMPLE 29

100 grams of a solid containing centrifuge stream obtained by centrifuging a calcium alkyl salicylate was heated to 160° F. and 220 cubic centimeters of 4 normal sulfuric acid was added to the centrifuge stream with vigorous agitation. Vigorous foaming occurred and the attempting to make the separation using only the sulfuric acid in the treatment.

The foregoing examples illustrate the versatility of the process of the invention and indicate that it should be useful in separating any normally liquid, water-insoluble organic compound from mixtures of the organic compound with inorganic solids.

We claim:

1. In a process for recovering hydrocarbon oils and hydrocarbon oils containing dissolved additives from filter cakes produced by filtering such oils using a siliceous filter aid by contacting said filter cakes with an aqueous release agent selected from the group consisting of water solutions of an acid acting material and water solutions of a base acting material, the improvement which comprises:
   (a) mixing the filter cake with about 0.5 cc to about 5.0 cc of release agent per gram of filter cake while maintaining the filter cake and added release agent at temperature above about 180° F.;
   (b) maintaining the mixture resluting from step (a) at a temperature above 150° F. until an oil phase separates, and
   (c) separating the oil phase.

2. The process defined in claim 1 wherein the filter cake is produced during filtration of zinc dialkyl dithiophosphate and the improvement further comprising using as the release agent citric acid-sodium citrate dissolved in 20% sodium chloride solution to form a solution having a pH about 4.5.

3. In a process for recovering hydrocarbon oils and hydrocarbon oils containig dissolved additives from filter cakes produced by filtering such oils using a siliceous filter aid by contacting said filter cakes with an aqueous release agent selected from the group consisting of water solutions of an acid acting material and water solutions of a base acting material, the improvement which comprises:
   (a) slowly adding to the filter cake from about 0.5 cc to about 5.0 cc of release agent per gram of filter cake while maintaining the filter cake and added release agent at a temperature in the range of from about 180° F. to the boiling temperature of the release agent,
   (b) maintaining the mixture resulting from step (a) relatively quiescent at a temperature above 150° F. until an oil phase separates,
   (c) separating the oil phase.

4. In a process for recovering hydrocarbon oils and hydrocarbon oils containing dissolved additives from filter cakes produced when filtering said oils using a siliceous filter aid by contacting said filter cakes with an aqueous release agent selected from the group consisting of water solutions of an acid acting material and water solutions of a base acting material, the improved method which comprises:
   (a) mixing the filter cake with from about 0.5 cc to 2 cc of release agent per gram of filter cake,
   (b) maintaining the resultant mixture at an elevated temperature above about 180° F.,
   (c) agitating the heated mixture to produce a homogeneous slurry,
   (d) holding the slurry quiescent at said elevated temperature until an oil layer forms on the upper surface of the slurry,
   (e) adding to the hot slurry while gently stirring a further quantity of hot release agent to bring the release agent to filter cake ratio to a level in the range about 3 cc to 5 cc of release agent per gram of filter cake,
   (f) maintaining the resultant mixture in relatively quiescent condition at a temperature of at least 150° F. until an oil phase separates on the surface of the mixture, and
   (g) separating the oil phase.

5. The process defined n claim 4 wherein the improvement further comprises the further step of filtering the mixture remaining after separation of the oil phase in step (g) to separate a filtrate comprising release agent and a filter cake comprising filter aid.

6. The process as defined in claim 4 wherein the filter cake is a pasty putty-like mass and the improvement further comprising working into the filter cake mass from 0.25 to 1 cc of a low boiling hydrocarbon per gram of filter cake prior to performing step (a).

7. The process as defined in claim 4 wherein the filter cake is produced during filtration of an oil containing a calcium phenate additive, the improvement futher comprising using as the release agent an aqueous solution of sulfuric acid and the quantity of release agent added is sufficient to bring the pH of the resultant mixture to a level in the range about 8 to 9.

8. The process as defined in claim 4 wherein the filter cake is produced during filtration of an oil containing a succinimide additive and the improvement further comprises using as the release agent an aqueous solution of sodium carbonate.

9. The process defined in claim 4 wherein the filter cake is produced during filtration of an oil containing an alkaline earth metal sulfonate and the improvement further comprising using as the treating agent an aqueous solution of sulfuric acid.

10. The process defined in claim 4 wherein the filter cake is produced during filtration of an oil containing a viscosity index improver and the improvement further comprising using as the release agent a solution of sodium carbonate.

* * * * *